(12) United States Patent
Reshef et al.

(10) Patent No.: US 10,642,889 B2
(45) Date of Patent: May 5, 2020

(54) UNSUPERVISED AUTOMATED TOPIC DETECTION, SEGMENTATION AND LABELING OF CONVERSATIONS

(71) Applicant: GONG I.O Ltd., Herzliya (IL)

(72) Inventors: Eilon Reshef, Tel Aviv (IL); Zvi Marx, D.N. Merkaz (IL)

(73) Assignee: GONG I.O LTD., Ramat-Gan (IL)

( * ) Notice: Subject to any disclaimer, the term of this patent is extended or adjusted under 35 U.S.C. 154(b) by 385 days.

(21) Appl. No.: 15/834,090

(22) Filed: Dec. 7, 2017

(65) Prior Publication Data

US 2018/0239822 A1    Aug. 23, 2018

Related U.S. Application Data

(60) Provisional application No. 62/460,899, filed on Feb. 20, 2017.

(51) Int. Cl.
*G06F 16/61* (2019.01)
*G06F 16/683* (2019.01)
(Continued)

(52) U.S. Cl.
CPC ............ *G06F 16/61* (2019.01); *G06F 16/685* (2019.01); *G06F 40/211* (2020.01);
(Continued)

(58) Field of Classification Search
CPC ...... G06F 16/61; G06F 40/284; G06F 40/242; G06F 40/211; G06F 40/35; G06F 16/685;
(Continued)

(56) References Cited

U.S. PATENT DOCUMENTS 6,185,527 B1    2/2001    Petkovic et al.
6,324,282 B1    11/2001    McIllwaine et al.
(Continued)

FOREIGN PATENT DOCUMENTS

WO    2005071666 A1    8/2005
WO    2012151716 A1    11/2012

OTHER PUBLICATIONS

Anguera., "Speaker Independent Discriminant Feature Extraction for Acoustic Pattern-Matching", IEEE International Conference on Acoustics, Speech and Signal Processing (ICASSP), 4 pages, Mar. 25-30, 2012.
(Continued)

*Primary Examiner* — Jorge A Casanova
(74) *Attorney, Agent, or Firm* — Kligler & Associates Patent Attorneys Ltd

(57) ABSTRACT

A method for information processing includes receiving in a computer a corpus of recorded conversations, with two or more speakers participating in each conversation. Respective frequencies of occurrence of multiple words in each of a plurality of chunks in each of the recorded conversations are computed. Based on the frequencies of occurrence of the words over the conversations in the corpus, an optimal set of topics to which the chunks can be assigned is derived, such that the optimal set maximizes a likelihood that the chunks will be generated by the topics in the set. A recorded conversation from the corpus is segmented using the derived topics into a plurality of segments, such that each segment is classified as belonging to a particular topic in the optimal set.

33 Claims, 4 Drawing Sheets

(51) Int. Cl.
  *G06F 40/211* (2020.01)
  *G06F 40/242* (2020.01)
  *G06F 40/284* (2020.01)
  *G06F 40/35* (2020.01)
  *G06N 5/02* (2006.01)
  *G06N 7/00* (2006.01)
  *G06N 20/00* (2019.01)
  *G10L 15/04* (2013.01)
  *G10L 15/18* (2013.01)
  *G10L 15/26* (2006.01)

(52) U.S. Cl.
  CPC .......... *G06F 40/242* (2020.01); *G06F 40/284* (2020.01); *G06F 40/35* (2020.01); *G06N 5/022* (2013.01); *G06N 7/005* (2013.01); *G06N 20/00* (2019.01); *G10L 15/04* (2013.01); *G10L 15/1815* (2013.01); *G10L 15/26* (2013.01)

(58) Field of Classification Search
  CPC ..... G10L 15/26; G10L 15/1815; G10L 15/04; G06N 7/005; G06N 20/00; G06N 20/10; G06N 20/20; G06N 5/022
  See application file for complete search history.

(56) References Cited

U.S. PATENT DOCUMENTS

| | | |
|---|---|---|
| 6,363,145 B1 | 3/2002 | Shaffer et al. |
| 6,434,520 B1 | 8/2002 | Kanevsky et al. |
| 6,542,602 B1 | 4/2003 | Elazar |
| 6,603,854 B1 | 8/2003 | Judkins et al. |
| 6,724,887 B1 | 4/2004 | Eilbacher et al. |
| 6,741,697 B2 | 5/2004 | Benson et al. |
| 6,775,377 B2 | 8/2004 | McIllwaine et al. |
| 6,914,975 B2 | 7/2005 | Koehler et al. |
| 6,922,466 B1 | 7/2005 | Peterson et al. |
| 6,959,080 B2 | 10/2005 | Dezonno et al. |
| 6,970,821 B1 | 11/2005 | Shambaugh et al. |
| 7,010,106 B2 | 3/2006 | Gritzer et al. |
| 7,076,427 B2 | 7/2006 | Scarano et al. |
| 7,151,826 B2 | 12/2006 | Shambaugh et al. |
| 7,203,285 B2 | 4/2007 | Blair |
| 7,281,022 B2 | 10/2007 | Gruhl et al. |
| 7,305,082 B2 | 12/2007 | Elazar |
| 7,373,608 B2 | 5/2008 | Lentz |
| 7,457,404 B1 | 11/2008 | Hession et al. |
| 7,460,659 B2 | 12/2008 | Shambaugh et al. |
| 7,474,633 B2 | 1/2009 | Halbraich et al. |
| RE40,634 E | 2/2009 | Blair et al. |
| 7,548,539 B2 | 6/2009 | Kouretas et al. |
| 7,570,755 B2 | 8/2009 | Williams et al. |
| 7,577,246 B2 | 8/2009 | Idan et al. |
| 7,596,498 B2 | 9/2009 | Basu et al. |
| 7,599,475 B2 | 10/2009 | Eilam et al. |
| 7,613,290 B2 | 11/2009 | Williams et al. |
| 7,631,046 B2 | 12/2009 | Litvin et al. |
| 7,660,297 B2 | 2/2010 | Fisher et al. |
| 7,664,641 B1 | 2/2010 | Pettay et al. |
| 7,702,532 B2 | 4/2010 | Vigil |
| 7,716,048 B2 | 5/2010 | Pereg et al. |
| 7,728,870 B2 | 6/2010 | Rudnik et al. |
| 7,739,115 B1 | 6/2010 | Pettay et al. |
| RE41,608 E | 8/2010 | Blair et al. |
| 7,769,622 B2 | 8/2010 | Reid et al. |
| 7,770,221 B2 | 8/2010 | Frenkel et al. |
| 7,783,513 B2 | 8/2010 | Lee |
| 7,817,795 B2 | 10/2010 | Gupta et al. |
| 7,852,994 B1 | 12/2010 | Blair et al. |
| 7,853,006 B1 | 12/2010 | Fama et al. |
| 7,869,586 B2 | 1/2011 | Conway et al. |
| 7,873,035 B2 | 1/2011 | Kouretas et al. |
| 7,881,216 B2 | 2/2011 | Blair |
| 7,881,471 B2 | 2/2011 | Spohrer et al. |
| 7,882,212 B1 | 2/2011 | Nappier et al. |
| 7,899,176 B1 | 3/2011 | Calahan et al. |
| 7,899,178 B2 | 3/2011 | Williams, II et al. |
| 7,904,481 B1 | 3/2011 | Deka et al. |
| 7,925,889 B2 | 3/2011 | Blair |
| 7,949,552 B2 | 5/2011 | Korenblit et al. |
| 7,953,219 B2 | 5/2011 | Freedman et al. |
| 7,953,621 B2 | 5/2011 | Fama et al. |
| 7,965,828 B2 | 6/2011 | Calahan et al. |
| 7,966,187 B1 | 6/2011 | Pettay et al. |
| 7,966,265 B2 | 6/2011 | Schalk et al. |
| 7,991,613 B2 | 8/2011 | Blair |
| 7,995,717 B2 | 8/2011 | Conway et al. |
| 8,000,465 B2 | 8/2011 | Williams et al. |
| 8,005,675 B2 | 8/2011 | Wasserblat et al. |
| 8,050,921 B2 | 11/2011 | Mark et al. |
| 8,055,503 B2 | 11/2011 | Scarano et al. |
| 8,078,463 B2 | 12/2011 | Wasserblat et al. |
| 8,086,462 B1 | 12/2011 | Alonso et al. |
| 8,094,587 B2 | 1/2012 | Halbraich et al. |
| 8,094,803 B2 | 1/2012 | Danson et al. |
| 8,107,613 B2 | 1/2012 | Gumbula |
| 8,108,237 B2 | 1/2012 | Bourne et al. |
| 8,112,298 B2 | 2/2012 | Bourne et al. |
| RE43,255 E | 3/2012 | Blair et al. |
| RE43,324 E | 4/2012 | Blair et al. |
| 8,150,021 B2 | 4/2012 | Geva et al. |
| 8,160,233 B2 | 4/2012 | Keren et al. |
| 8,165,114 B2 | 4/2012 | Halbraich et al. |
| 8,180,643 B1 | 5/2012 | Pettay et al. |
| 8,189,763 B2 | 5/2012 | Blair |
| 8,194,848 B2 | 6/2012 | Zernik et al. |
| 8,199,886 B2 | 6/2012 | Calahan et al. |
| 8,199,896 B2 | 6/2012 | Portman et al. |
| 8,204,056 B2 | 6/2012 | Dong et al. |
| 8,204,884 B2 | 6/2012 | Freedman et al. |
| 8,214,242 B2 | 7/2012 | Agapi et al. |
| 8,219,401 B1 | 7/2012 | Pettay et al. |
| 8,243,888 B2 | 8/2012 | Cho |
| 8,255,542 B2 | 8/2012 | Henson |
| 8,275,843 B2 | 9/2012 | Anantharaman et al. |
| 8,285,833 B2 | 10/2012 | Blair |
| 8,290,804 B2 | 10/2012 | Gong |
| 8,306,814 B2 | 11/2012 | Dobry et al. |
| 8,326,631 B1 | 12/2012 | Watson |
| 8,340,968 B1 | 12/2012 | Gershman |
| 8,345,828 B2 | 1/2013 | Williams et al. |
| 8,396,732 B1 | 3/2013 | Nies et al. |
| 8,411,841 B2 | 4/2013 | Edwards et al. |
| 8,442,033 B2 | 5/2013 | Williams et al. |
| 8,467,518 B2 | 6/2013 | Blair |
| 8,526,597 B2 | 9/2013 | Geva et al. |
| 8,527,269 B1* | 9/2013 | Kapur .................. G06F 40/284 704/235 |
| 8,543,393 B2 | 9/2013 | Barnish |
| 8,611,523 B2 | 12/2013 | Conway et al. |
| 8,649,499 B1 | 2/2014 | Koster et al. |
| 8,670,552 B2 | 3/2014 | Keren et al. |
| 8,675,824 B1 | 3/2014 | Barnes et al. |
| 8,706,498 B2 | 4/2014 | George |
| 8,761,376 B2 | 4/2014 | Pande et al. |
| 8,718,266 B1 | 5/2014 | Williams et al. |
| 8,719,016 B1 | 5/2014 | Ziv et al. |
| 8,724,778 B1 | 5/2014 | Barnes et al. |
| 8,725,518 B2 | 5/2014 | Waserblat et al. |
| 8,738,374 B2 | 5/2014 | Jaroker |
| 8,787,552 B1 | 7/2014 | Zhao et al. |
| 8,798,254 B2 | 8/2014 | Naparstek et al. |
| 8,806,455 B1 | 8/2014 | Katz |
| 8,861,708 B2 | 10/2014 | Kopparapu et al. |
| 8,903,078 B2 | 12/2014 | Blair |
| 8,909,590 B2 | 12/2014 | Newnham et al. |
| 8,971,517 B2 | 3/2015 | Keren et al. |
| 8,990,238 B2 | 3/2015 | Goldfarb |
| 9,020,920 B1 | 4/2015 | Haggerty et al. |
| 9,025,736 B2 | 5/2015 | Meng et al. |
| 9,053,750 B2 | 6/2015 | Gibbon et al. |
| 9,083,799 B2 | 7/2015 | Loftus et al. |
| 9,092,733 B2 | 7/2015 | Sneyders et al. |

(56) References Cited

U.S. PATENT DOCUMENTS

| | | | |
|---|---|---|---|
| 9,135,630 B2 | 9/2015 | Goldfarb et al. | |
| 9,148,511 B2 | 9/2015 | Ye et al. | |
| 9,160,853 B1 | 10/2015 | Daddi et al. | |
| 9,160,854 B1 | 10/2015 | Daddi et al. | |
| 9,167,093 B2 | 10/2015 | Geffen et al. | |
| 9,195,635 B2* | 11/2015 | Liu | G06F 40/10 |
| 9,197,744 B2 | 11/2015 | Sittin et al. | |
| 9,213,978 B2 | 12/2015 | Melamed et al. | |
| 9,214,001 B2 | 12/2015 | Rawle | |
| 9,232,063 B2 | 1/2016 | Romano et al. | |
| 9,232,064 B1 | 1/2016 | Skiba et al. | |
| 9,253,316 B1 | 2/2016 | Williams et al. | |
| 9,262,175 B2 | 2/2016 | Lynch et al. | |
| 9,269,073 B2 | 2/2016 | Sammon et al. | |
| 9,270,826 B2 | 2/2016 | Conway et al. | |
| 9,300,790 B2 | 3/2016 | Gainsboro et al. | |
| 9,311,914 B2 | 4/2016 | Wasserbat et al. | |
| 9,368,116 B2 | 6/2016 | Ziv et al. | |
| 9,401,145 B1 | 7/2016 | Ziv et al. | |
| 9,401,990 B2 | 7/2016 | Teitelman et al. | |
| 9,407,768 B2 | 8/2016 | Conway et al. | |
| 9,412,362 B2 | 8/2016 | Iannone et al. | |
| 9,418,152 B2 | 8/2016 | Nissan et al. | |
| 9,420,227 B1 | 8/2016 | Shires et al. | |
| 9,432,511 B2 | 8/2016 | Conway et al. | |
| 9,460,394 B2 | 10/2016 | Krueger et al. | |
| 9,460,722 B2 | 10/2016 | Sidi et al. | |
| 9,497,167 B2 | 11/2016 | Weintraub et al. | |
| 9,503,579 B2 | 11/2016 | Watson et al. | |
| 9,508,346 B2 | 11/2016 | Achituv et al. | |
| 9,589,073 B2 | 3/2017 | Yishay | |
| 9,596,349 B1 | 3/2017 | Hernandez | |
| 9,633,650 B2 | 4/2017 | Achituv et al. | |
| 9,639,520 B2 | 5/2017 | Yishay | |
| 9,690,873 B2 | 6/2017 | Yishay | |
| 9,699,409 B1 | 7/2017 | Reshef | |
| 9,785,701 B2 | 10/2017 | Yishay | |
| 9,936,066 B1 | 4/2018 | Mammen et al. | |
| 9,947,320 B2 | 4/2018 | Lembersky et al. | |
| 9,953,048 B2 | 4/2018 | Weisman et al. | |
| 9,977,830 B2 | 5/2018 | Romano et al. | |
| 10,079,937 B2 | 9/2018 | Nowak et al. | |
| 10,134,400 B2 | 11/2018 | Ziv et al. | |
| 10,516,782 B2* | 12/2019 | Cartwright | G10L 25/48 |
| 10,522,151 B2* | 12/2019 | Cartwright | G06F 16/61 |
| 2004/0021765 A1 | 2/2004 | Kubala et al. | |
| 2007/0129942 A1 | 6/2007 | Ban et al. | |
| 2008/0154579 A1* | 6/2008 | Kummamuru | G06F 16/685 704/9 |
| 2008/0300872 A1 | 12/2008 | Basu et al. | |
| 2010/0104086 A1 | 4/2010 | Park | |
| 2010/0217592 A1* | 8/2010 | Gupta | G06F 40/35 704/236 |
| 2010/0246799 A1 | 9/2010 | Lubowich et al. | |
| 2011/0258188 A1* | 10/2011 | AbdAlmageed | G06F 16/7844 707/736 |
| 2013/0144603 A1* | 6/2013 | Lord | G06F 3/165 704/9 |
| 2013/0185308 A1* | 7/2013 | Itoh | G06F 40/30 707/748 |
| 2013/0300939 A1 | 11/2013 | Chou et al. | |
| 2014/0229471 A1 | 8/2014 | Galvin, Jr. et al. | |
| 2014/0278377 A1 | 9/2014 | Peters et al. | |
| 2015/0066935 A1 | 3/2015 | Peters et al. | |
| 2015/0243276 A1* | 8/2015 | Cooper | G06F 16/7834 704/251 |
| 2016/0110343 A1 | 4/2016 | Kumar Rangarajan Sridhar | |
| 2017/0039265 A1* | 2/2017 | Steele, Jr. | G06F 40/205 |
| 2018/0150698 A1* | 5/2018 | Guttmann | G06K 9/00718 |
| 2018/0253988 A1* | 9/2018 | Kanayama | G09B 5/06 |
| 2018/0329884 A1* | 11/2018 | Xiong | G06N 3/0445 |

OTHER PUBLICATIONS

Church et al., "Speaker Diarization: A Perspective on Challenges and Opportunities From Theory to Practice", IEEE International Conference on Acoustics, Speech and Signal Processing (ICASSP), pp. 4950-4954, Mar. 5-9, 2017.

Hieu., "Speaker Diarization in Meetings Domain", A thesis submitted to the School of Computer Engineering of the Nanyang Technological University, 149 pages, Jan. 2015.

Shum et al., "Unsupervised Methods for Speaker Diarization: An Integrated and Iterative Approach", IEEE Transactions on Audio, Speech, and Language Processing, vol. 21, No. 10, pp. 2015-2028, Oct. 2013.

Serrano, "Speaker Diarization and Tracking in Multiple-Sensor Environments", Dissertation presented for the degree of Doctor of Philosophy, Universitat Politecnica de Catalunya, Spain, 323 pages, Oct. 2012.

Friedland et al., "Multi-modal speaker diarization of real-world meetings using compressed-domain video features", International Conference on Acoustics, Speech and Signal Processing (ICASSP'09), 4 pages, Apr. 19-24, 2009.

Anguera., "Speaker Diarization: A Review of Recent Research", First draft submitted to IEEE TASLP 15 pages, Aug. 19, 2010.

Balwani et al., "Speaker Diarization: A Review and Analysis", International Journal of Integrated Computer Applications & Research (IJICAR), vol. 1, issue 3, 5 pages, 2015.

Evans et al., "Comparative Study of Bottom-Up and Top-Down Approaches to Speaker Diarization", IEEE Transactions on Audio, Speech, and Language Processing, vol. 20, No. 2, pp. 382-392, Feb. 2012.

Sasikala et al., "A Survey on Speaker Diarization Approach for Audio and Video Content Retrieval", International Journal of Research and Computational Technology, vol. 5, issue 4, 8 pages, Dec. 2013.

Wang et al., "Speaker Diarization with LSTM, Electrical Engineering and Systems Science", IEEE International Conference on Acoustics, Speech and Signal Processing, Calgary, Canada, pp. 5239-5243, Apr. 15-20, 2018.

Moattar et al., "A review on speaker diarization systems and approaches", Speech Communication, vol. 54, No. 10, pp. 1065-1103, year 2012.

International Application # PCT/IB2017/058049 search report dated Apr. 12, 2018.

\* cited by examiner

UNSUPERVISED AUTOMATED TOPIC DETECTION, SEGMENTATION AND LABELING OF CONVERSATIONS

CROSS-REFERENCE TO RELATED APPLICATION

This application claims the benefit of U.S. Provisional Patent Application 62/460,899, filed Feb. 20, 2017, which is incorporated herein by reference.

COMPUTER PROGRAM LISTING APPENDIX

A computer program listing is submitted herewith as an Appendix and is incorporated herein by reference.

FIELD OF THE INVENTION

The present invention relates generally to natural language processing, and particularly to systems, methods and software for analyzing the content of conversations.

BACKGROUND

Huge amounts of information are exchanged among participants in teleconferences (meaning conversations, i.e., oral exchanges, between two or more participants over a communication network, including both telephone and packet networks). In many organizations, teleconferences are recorded and available for subsequent review. Even when the teleconferences are transcribed to textual form, however, reviewing the records is so time-consuming that the vast majority of the information cannot be exploited.

A number of tools have been developed to automate the extraction of information from teleconferences. For example, U.S. Patent Application Publication 2014/0278377 describes arrangements relating to automatically taking notes in a virtual meeting. The virtual meeting has meeting content that includes a plurality of meeting content streams. One or more of the meeting content streams is in a non-text format. The one or more meeting content streams in a non-text format can be converted into text. As a result, the plurality of meeting content streams is in text format. The text of the plurality of meeting content streams can be analyzed to identify a key element within the text. Consolidated system notes that include the key element can be generated.

As another example, U.S. Patent Application Publication 2004/0021765 describes an automated meeting facilitator, which manages and archives a telemeeting. The automated meeting facilitator includes a multimedia indexing section, which generates rich transcriptions of the telemeeting and stores documents related to the telemeeting. Through the rich transcription, the automated meeting facilitator is able to provide a number of real-time search and assistance functions to the meeting participants.

Some automated tools relate to topics of discussions. For example, U.S. Patent Application Publication 2014/0229471 describes a method, computer program product, and system for ranking meeting topics. A plurality of participants in an electronic meeting is identified. One or more interests associated with one or more individuals included in the plurality of participants are identified. One or more topics associated with the meeting are received. A ranking of the one or more topics is determined based upon, at least in part, the one or more identified interests.

Automated analysis of teleconferences can be particularly useful in the context of enterprise contact centers. For example, in this regard U.S. Pat. No. 8,611,523 describes a method and system for analyzing an electronic communication, more particularly, to analyzing a telephone communication between a customer and a contact center to determine communication objects, forming segments of like communication objects, determining strength of negotiations between the contact center and the customer from the segments, and automating setup time calculation.

As another example, U.S. Patent Application Publication 2010/0104086 describes a system and method for automatic call segmentation including steps and means for automatically detecting boundaries between utterances in the call transcripts; automatically classifying utterances into target call sections; automatically partitioning the call transcript into call segments; and outputting a segmented call transcript. A training method and apparatus for training the system to perform automatic call segmentation includes steps and means for providing at least one training transcript with annotated call sections; normalizing the at least one training transcript; and performing statistical analysis on the at least one training transcript.

SUMMARY

Embodiments of the present invention that are described hereinbelow provide improved methods, apparatus and software for automated analysis of conversations.

There is therefore provided, in accordance with an embodiment of the invention, a method for information processing, which includes receiving in a computer a corpus of recorded conversations, with two or more speakers participating in each conversation. The computer computes respective frequencies of occurrence of multiple words in each of a plurality of chunks in each of the recorded conversations. Based on the frequencies of occurrence of the words over the conversations in the corpus, the computer derives autonomously an optimal set of topics to which the chunks can be assigned such that the optimal set maximizes a likelihood that the chunks will be generated by the topics in the set. A recorded conversation from the corpus is segmented using the derived topics into a plurality of segments, such that each segment is classified as belonging to a particular topic in the optimal set, and a distribution of the segments and respective classifications of the segments into the topics over a duration of the recorded conversation is outputted.

In a disclosed embodiment, deriving the optimal set of the topics includes extracting the topics from the conversations by the computer without using a pre-classified training set. Additionally or alternatively, receiving the corpus includes converting the conversations to a textual form, analyzing a syntax of the conversations in the textual form, and discarding from the corpus the conversations in which the analyzed syntax does not match syntactical rules of a target language.

In a disclosed embodiment, deriving the optimal set of topics includes defining a target number of topics, and applying Latent Dirichlet Allocation to the corpus in order to derive the target number of the topics.

In some embodiments, the method includes automatically assigning, by the computer, respective titles to the topics. In one embodiment, automatically assigning the respective titles includes, for each topic, extracting from the segments of the conversations in the corpus that are classified as belonging to the topic one or more n-grams that statistically differentiate the segments classified as belonging to the topic from the segments that belong to the remaining topics in the set, and selecting one of the extracted n-grams as a title for the topic.

Additionally or alternatively, deriving the optimal set of the topics includes computing, based on the frequencies of occurrence of the words in the chunks, respective probabilities of association between the words and the topics, and segmenting the recorded conversation includes classifying each segment according to the respective probabilities of association of the words occurring in the segment. In one embodiment, computing the respective probabilities of association includes computing respective word scores for each word with respect to each of the topics based on the probabilities of association, and classifying each segment includes, for each chunk of the recorded conversation, deriving respective topic scores for the topics in the set by combining the word scores of the words occurring in the chunk with respect to each of the topics, classifying the chunks into topics based on the respective topic scores, and defining the segments by grouping together adjacent chunks that are classified as belonging to a common topic.

In some embodiments, outputting the distribution includes displaying the distribution of the segments and respective classifications of the segments into the topics on a computer interface. In a disclosed embodiment, displaying the distribution includes presenting a timeline that graphically illustrates the respective classifications and durations of the segments during the recorded conversation. Typically, presenting the timeline includes showing which of the speakers was speaking at each time during the recorded conversation.

In one embodiment, deriving the optimal set of topics includes receiving seed words for one or more of the topics from a user of the computer.

In some embodiments, the method includes automatically applying, by the computer, the distribution of the segments in predicting whether a given conversation is likely to result in a specified outcome and/or in assessing whether a given conversation follows a specified pattern.

There is also provided, in accordance with an embodiment of the invention, an information processing system, including a memory, which is configured to store a corpus of recorded conversations, with two or more speakers participating in each conversation. A processor is configured to compute respective frequencies of occurrence of multiple words in each of a plurality of chunks in each of the recorded conversations, and to derive autonomously, based on the frequencies of occurrence of the words over the conversations in the corpus, an optimal set of topics to which the chunks can be assigned such that the optimal set maximizes a likelihood that any given chunk will be assigned to a single topic in the set, and to segment a recorded conversation from the corpus, using the derived topics into a plurality of segments, such that each segment is classified as belonging to a particular topic in the optimal set, and to output a distribution of the segments and respective classifications of the segments into the topics over a duration of the recorded conversation.

There is additionally provided, in accordance with an embodiment of the invention, a computer software product, including a non-transitory computer-readable medium in which program instructions are stored, which instructions, when read by a computer, cause the computer to store a corpus of recorded conversations, with two or more speakers participating in each conversation, to compute respective frequencies of occurrence of multiple words in each of a plurality of chunks in each of the recorded conversations, and to derive autonomously, based on the frequencies of occurrence of the words over the conversations in the corpus, an optimal set of topics to which the chunks can be assigned such that the optimal set maximizes a likelihood that any given chunk will be assigned to a single topic in the set, and to segment a recorded conversation from the corpus, using the derived topics into a plurality of segments, such that each segment is classified as belonging to a particular topic in the optimal set, and to output a distribution of the segments and respective classifications of the segments into the topics over a duration of the recorded conversation.

The present invention will be more fully understood from the following detailed description of the embodiments thereof, taken together with the drawings in which:

DETAILED DESCRIPTION OF EMBODIMENTS

Overview

Figure 1:
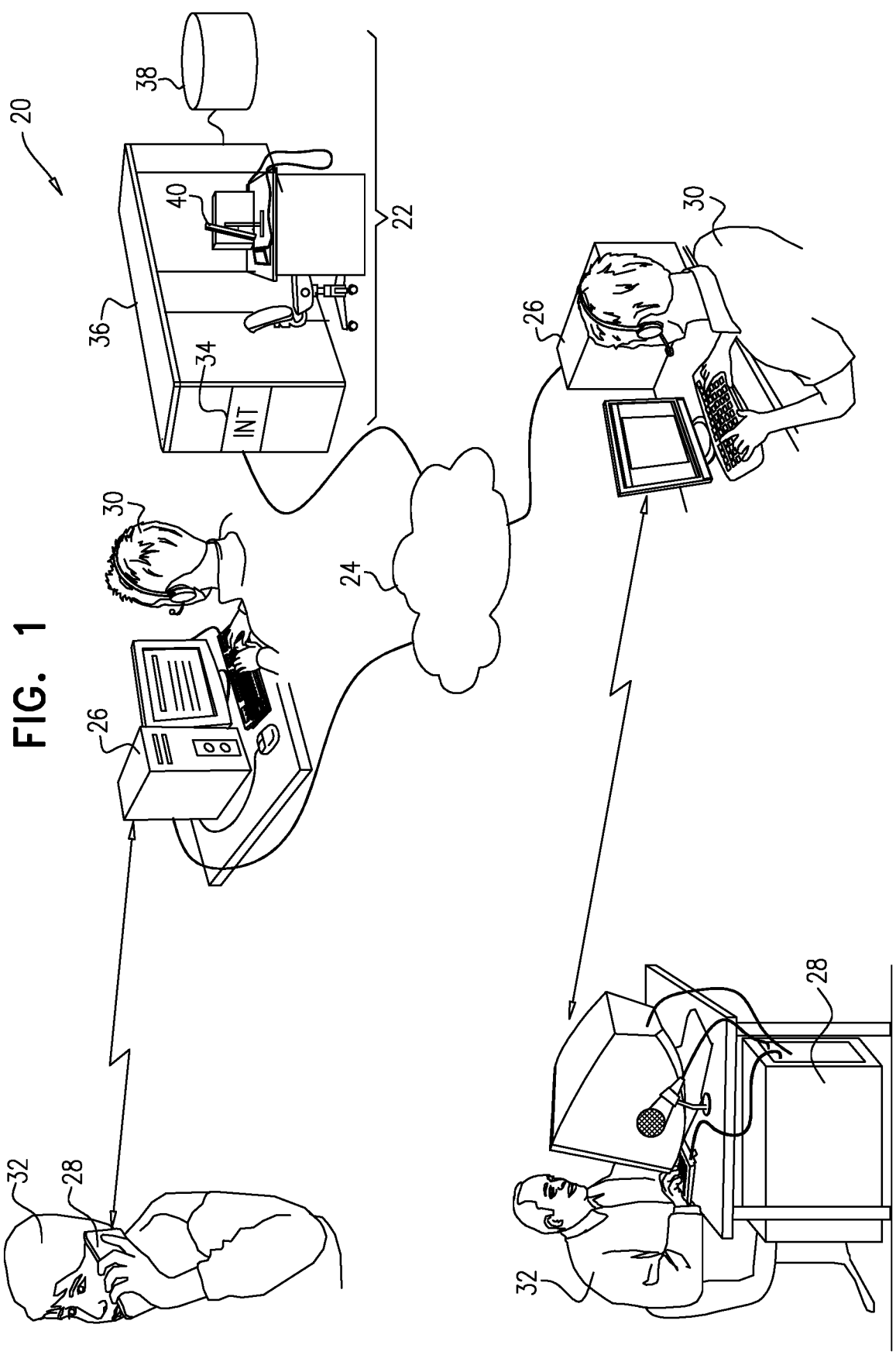
FIG. 1 is schematic pictorial illustration of a teleconferencing system, in accordance with an embodiment of the invention.

Existing tools for segmentation and classification of recorded conversations generally rely on a training set, i.e., a set of conversations that has been segmented and classified by a human expert. A computer uses this training set in deriving classification rules, which can then be applied automatically in segmenting and classifying further conversations. Although this sort of supervised computer learning is a well-established approach, it requires a large investment of time and expertise to prepare a training set that will give good results. Each new installation of the tool will generally require its own training set to be developed in this manner, since topics of conversation and vocabulary generally differ among different organizations and user groups. Furthermore, supervised learning approaches of this sort are limited by the knowledge of the export who prepares the training set, and can be biased by preconceptions of that expert. Subsequent changes in the nature of the documents require re-classification by experts.

Embodiments of the present invention that are described herein provide methods, systems and software that are capable of autonomously analyzing a corpus of conversations and outputting a digest of the topics discussed in each conversation. In contrast to tools that are known in the art, the present embodiments are capable of unsupervised learning, based on the corpus of conversations itself without any predefined training set, and thus obviate the need for expert involvement. The present embodiments are particularly useful in analyzing recorded teleconferences, but the principles of the present invention may similarly be applied to substantially any large corpus of recorded conversations.

In the disclosed embodiments, a computerized conversation processing system analyzes a corpus of recorded conversations, such as telephone calls, and identifies common patterns across the calls. The system automatically detects topics that repeat across the calls. So, for example, if several calls talk about marketing, e-mails and "open rates," the system can infer that this is a common topic (e-mail marketing) and can thus find it in other calls and then segment the calls based on this information. Because the process works "bottom up," it can detect topics that a human might not conceive of in advance, as long as the topics are common across multiple calls.

The system extracts the topics from the conversations in an unsupervised way, without a pre-classified training set or other human guidance. Thus, embodiments of the present invention offer the ability not merely to handle a single conversation according to predefined instructions, but rather to leverage the fact that in a given organization or domain there is a similarity in the conversations and thus to derive the topics that people actually talk about. Because the system is autonomous and does not require hand-crafted topic definitions or keywords, there is no need for a labor-intensive implementation process, and a new user with a bank of recorded conversations can start using the system immediately.

In the disclosed embodiments, a conversation processing system records or receives a group of recordings of conversations made by people in a given field, for example, sales agents working for a given company. The conversations are converted to text using methods and tools that are known in the art. Optionally, the conversations are filtered by language, for example, by automatically recognizing that a given conversation is not in a target language, such as English, and in that case discarding the conversation.

Following conversion to text and filtering, the system breaks the conversations into chunks, each typically comprising a series of several hundred words, for example. The system then processes the contents of these chunks autonomously, using a suitable machine learning algorithm, such as LDA (Latent Dirichlet Allocation), in order to derive an optimal set of topics such that the conversations are most likely to be composed of those topics. In other words, the optimal set is chosen so as to maximize the likelihood, across all conversations, that that the chunks can be generated by a mixture of those topics. The number of topics in the set can be defined in advance to be any suitable target number, for example a chosen number between ten and forty.

Topic derivation proceeds autonomously in this manner, without human supervision, to find an optimal set of topics, as well as to extract titles (labels) for the topics from among the words that commonly occur in the segments of conversation belonging to each topic. For example, for each topic, the computer may extract from the segments of the conversations that are classified as belonging to the topic one or more n-grams (i.e., recurring sequences of n words, wherein n is at least two) that statistically differentiate the segments classified as belonging to the topic from the segments that belong to other topics in the set. One of the extracted n-grams is then selected as the title for the topic.

Figure 4:
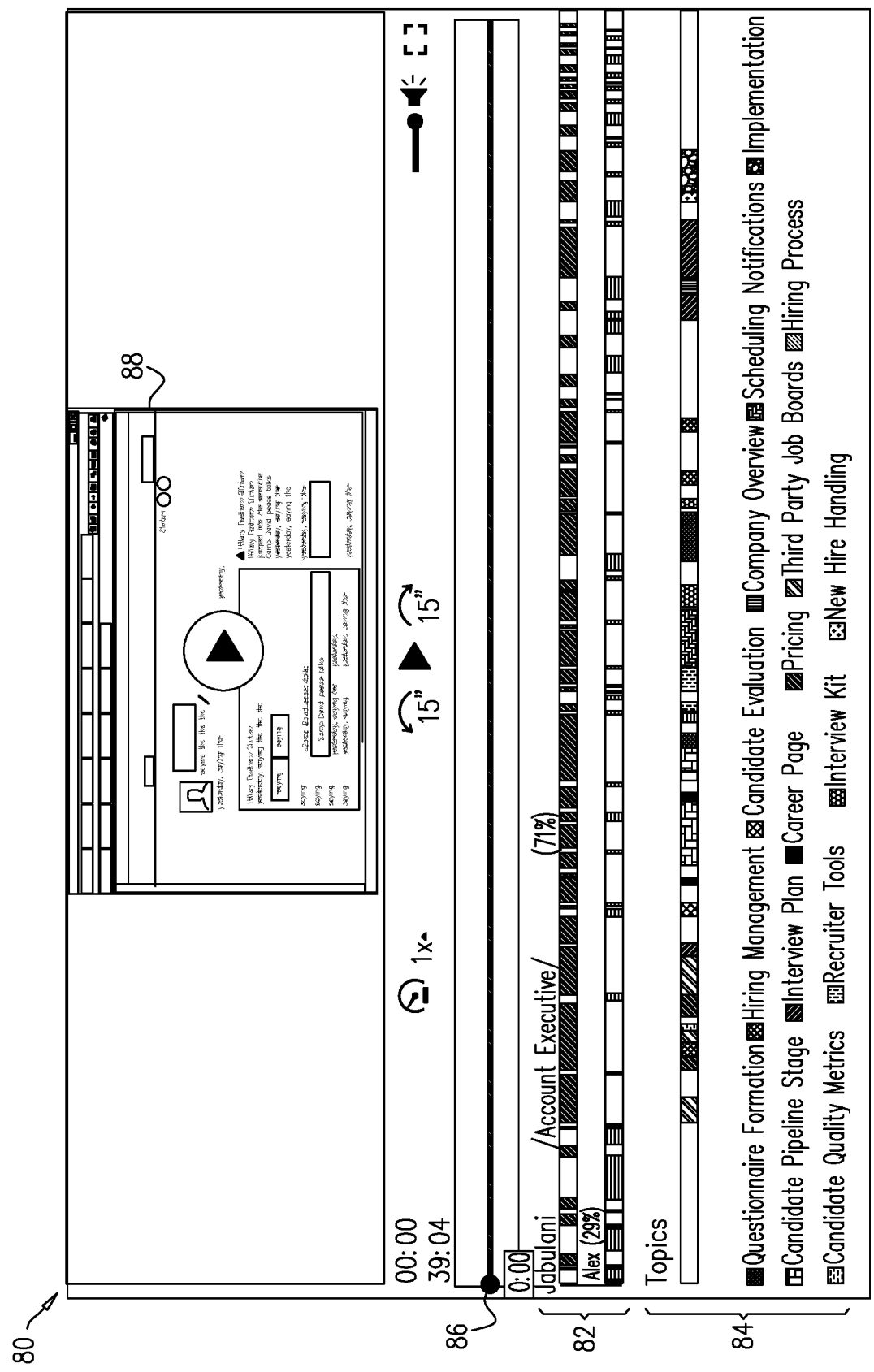
FIG. 4 is a schematic representation of a computer screen, showing a graphical analysis of a recorded conversation, in accordance with an embodiment of the invention.

Once the topics have been detected, the system is able to apply the topics and corresponding filtering criteria in sorting chunks of both existing and newly-recorded conversations by topic. The system thus segments recorded conversations such that each segment is classified as belonging to a particular topic in the optimal set (or to no topic when there was no topic that matched a given chunk or sequence of chunks). It can then output the distribution of the segments and respective classifications of the segments into topics over the duration of the conversation. In one embodiment, which is shown in FIG. 4, the output takes the form of a timeline display, which graphically illustrates the respective classifications and durations of the segments during the recorded conversation. The timeline may also show which of the speakers was speaking at each time during the recorded conversation. This particular mode of display is shown only by way of example, however, and alternative display formats, both graphical and textual, will be apparent to those skilled in the art and are considered to be within the scope of the present invention.

Based on the output of conversation segments and topics, a user of the system is able to understand how much of the conversation was devoted to each topic, as well as the sequence of discussion of different topics. The user can, if desired, move a time cursor to any desired location in the conversation timeline and receive a playback of the conversation at that point. Computer-aided statistical analyses can be applied, as well, in order to understand the relationship between topics covered in a group of conversations and results, such as success in closing sales.

System Description

FIG. 1 is schematic pictorial illustration of a teleconferencing system 20, in accordance with an embodiment of the invention. A server 22 receives and records conversations via a network 24. Server 22 may receive audio input from the conversations on line in real time, or it may receive recordings made and stored by other means, such as by computers 26, or even textual transcripts of conversations, created by speech-to-text programs running on other computers. As one example, server 22 may collect recordings of Web conferences using the methods described in U.S. patent application Ser. No. 15/275,397, filed Sep. 29, 2016, whose disclosure is incorporated herein by reference.

In the pictured embodiment, server 22 collects and analyzes conversations between sales agents 30, using computers 26, and customers 32, using audio devices 28. These conversations may be carried out over substantially any sort of network, including both telephone and packet networks. Although the conversations shown in FIG. 1 have two participants, server 22 may similarly apply the techniques described herein in analyzing conversations between three or more participants.

Server 22 comprises a processor 36, such as a general-purpose computer processor, which is connected to network 24 by a network interface 34. Server 22 receives and stores the corpus of recorded conversations in memory 38, for processing by processor 36. Processor 36 autonomously derives an optimal set of topics and uses these topics in segmenting the recorded conversations using the methods described herein. At the conclusion of this process, processor 36 is able to present the distribution of the segments of the conversations and the respective classifications of the segments into the topics over the duration of the recorded conversations on a display 40.

Processor 36 typically carries out the functions that are described herein under the control of program instructions in software. This software may be downloaded to server 22 in electronic form, for example over a network. Additionally or alternatively, the software may be provided and/or stored on tangible, non-transitory computer-readable media, such as optical, magnetic, or electronic memory media.

Topic Extraction

Figure 2:
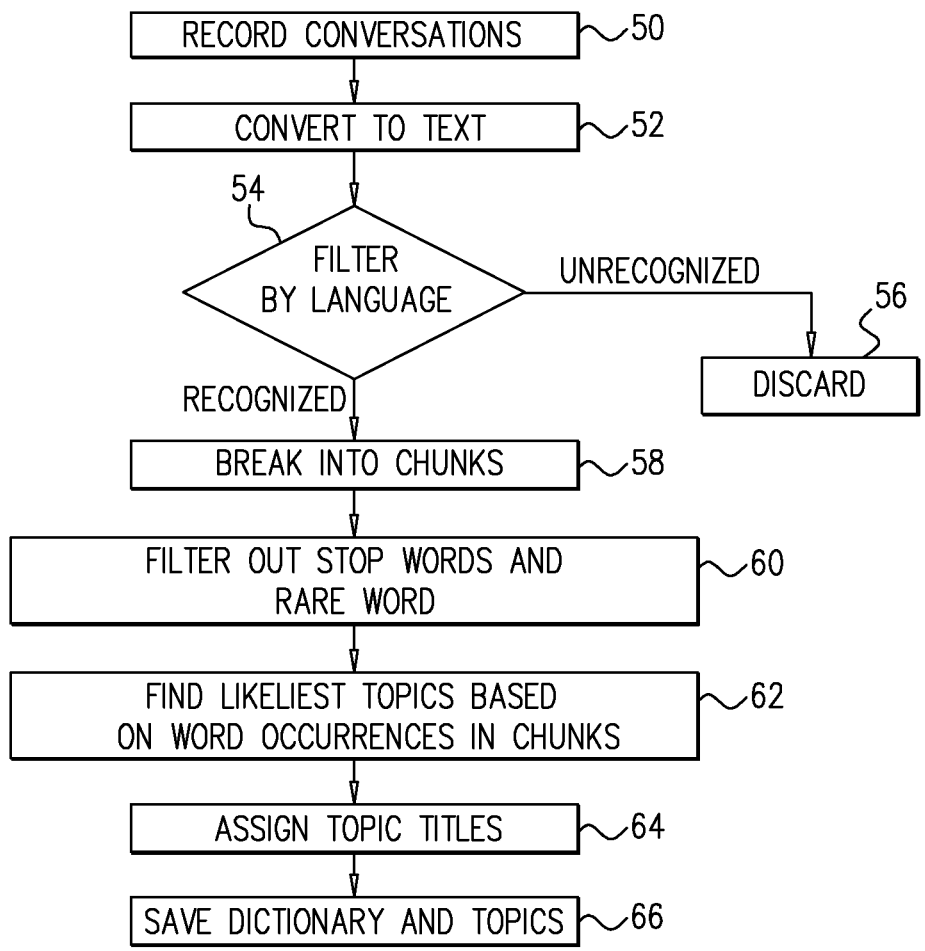
FIG. 2 is a flow chart that schematically illustrates a method for unsupervised extraction of topics from a corpus of recorded conversations, in accordance with an embodiment of the invention.

FIG. 2 is a flow chart that schematically illustrates a method for unsupervised extraction of topics from a corpus of recorded conversations, in accordance with an embodiment of the invention. In the description that follows, this method, as well as the other methods described below, is assumed to be carried out by server 22, but these methods may alternatively be implemented in other processing configurations, as will be apparent to those skilled in the art. All such implementations are considered to be within the scope of the present invention.

To initiate the method of FIG. 2, server 22 records a corpus of conversations in memory 38, at a recording step 50. The conversations in the corpus are assumed to belong to a certain shared domain, such as sales calls between agents 30 and customers 32 in the example shown in FIG. 1, so that there will be a commonality of topics among the conversations. If the recorded conversations are not already in textual form, processor 36 converts the oral conversation streams to text, at a speech-to-text conversion step 52. Any suitable sort of speech processing program that is known in the art may be used for this purpose.

Processor 36 filters the recorded conversations by language, at a conversation filtering step 54. This step can be important in the unsupervised learning process of FIG. 2 in eliminating spurious conversations that might otherwise impair the precision of classification. To detect any conversations that are not in a designated target language at step 54, processor 36 can analyze the words detected by the speech-to-text component in the target language to ensure that they follow the patterns of a "normal" conversation. When a set of words does not match the pattern of a real document (e.g., "who who I are then how"), the document can be classified as not belonging to the target language. Processor 36 discards any conversations in which the analyzed syntax does not match the target language, at a discard step 56.

To begin the actual topic extraction process, processor 36 breaks the conversations into chunks, at a chunk division step 58. A "chunk" is a continuous series of words of a selected length, or within a selected length range. For example, the inventors have found chunks of approximately 300 words each to give good result, while setting chunk boundaries so as to keep monologues separate and not mix different speakers in a single chunk.

As another preliminary step, it is also useful for processor 36 to filter out of the conversation transcripts certain types of words, such as stop words and rare words, at a word filtering step 60. "Stop words" is a term used in natural language processing to denote words that have little or no semantic meaning. The inventors have found it useful in this regard to filter out roughly one hundred of the most common English words, including "a", "able", "about", "across", "after", "all", "almost", etc. Because such stop words have a roughly equal chance of appearing in any topic, removing them from the chunks can be helpful in speeding up subsequent topic extraction.

Processor 36 counts the number of occurrences of the remaining words in each of the chunks and in the corpus as a whole. Absent human supervision, words that appear only once or a few times (for example, less than four times) in the corpus cannot reliably be associated with a topic. Therefore, processor 36 eliminates these rare words, as well, at step 60 in order to speed up the topic extraction.

Based on the frequencies of occurrence of the words over the chunks of the conversations in the corpus, processor 36 autonomously derives an optimal set of topics to which the chunks can be assigned, at a topic derivation step 62. The set of topics is "optimal" in the sense that it maximizes (for the given number of topics in the set) the likelihood that the chunks can be generated by that set of topics. Various algorithms that are known in the art can be used for this purpose, but the inventors have found particularly that Latent Dirichlet Allocation (LDA) gives good results while executing quickly even over large corpuses of conversations. LDA is parametric, in the sense that it accepts the target number of topics, n, as an input. In the inventors' experience, 15-30 topics is a useful target for analysis of corpuses containing hundreds to thousands of conversations in a particular domain.

The use of LDA in topic extraction is described in detail in the above-mentioned U.S. Provisional Patent Application 62/460,899. To summarize briefly, LDA attempts to find a model M, made up of a combination of n topics, that maximizes the likelihood L that the conversations d in the corpus were created by this combination. Formally speaking, LDA seeks to maximize:

$$L = \prod_d p(w_d | M)$$

Here $p(w_d|M)$ is the probability that each word $w_d$ in conversation d was created by the model. To compute this probability, each document is assumed to be a mixture of topics, with probabilities that sum up to 1. The probability that a document was created by that mixture is the probability that the sequence of words was generated by the mixture of topics. The overall probability is then the composed probability that the entire corpus was created by the set of topics. Computationally, it is generally easier to work with the log likelihood, also known as "perplexity":

$$\text{Perplexity} \triangleq -\log \prod_d p(w_d | M) = \sum_d \log p(w_d | M)$$

Minimizing the perplexity necessarily maximizes the corresponding likelihood.

Step 62 can be carried out using LDA tools that are known in the art. A suitable program for this purpose is available in the Machine Learning for Language Toolkit (MALLET) offered by the University of Massachusetts at Amherst (available at mallet.cs.umass.edu). MALLET source code implementing LDA, which can be used in implementing the present method, is presented in a computer program listing submitted as an appendix hereto.

Because step 62 is carried out autonomously, using a predefined number of topics, in many cases some of the topics discovered will be more informative than others to people accessing the results. Users can optionally influence the topics that are detected by inputting, for any of the topics, one or more seed words. For example, a user may enter the words "cost" and "dollar" as seed words for one topic. These words are then used as a prior to the topic.

Once step 62 is completed, a set of topics has been derived. For each such topic, a probability distribution over the words is available.

Assigning Titles to Topics

After finding the optimal set of topics, processor 36 assigns titles to the topics, at a labeling step 64. The titles are useful subsequently in presenting segmentation results to a user of server 22. For this purpose, processor 36 identifies n-grams that are typical or characteristic of each topic by extracting n-grams from the chunks of the conversations in the corpus that statistically differentiate the chunks belonging to the topic from chunks belonging to the remaining topics in the set. One of the extracted n-grams is then selected as a title for the topic.

For example, at step 64, processor 36 can identify the top 20 n-grams ($2 \leq n \leq 5$) that differentiate each topic from all the rest of the text in the corpus. The differentiation can be carried out using a standard statistical G-test. For this purpose, each n-gram is scored based-on a 2×2 matrix M consisting of the following four values:

$M_{1,1}$=Occurrence count of the n-gram in the chunks belonging to the topic.

$M_{1,2}$=Occurrence count of the n-gram in the remaining chunks.

$M_{2,1}$=Occurrence count of all other n-grams in the chunks belonging to the topic.

$M_{2,2}$=Occurrence count of all other n-grams in the remaining chunks.

The G-test score of each n-gram for each topic is a likelihood ratio that reflects how well, or how "typically," the n-gram is characteristic of that topic.

Processor 36 filters the top-ranked n-grams for each topic (for example, the twenty n-grams with the highest G-test scores) in order to select the title of the topic. This filtering eliminates item overlap, by removing n-grams that are contained as a substring in another n-gram in the list. The highest ranking n-gram is determined to be the topic title; users of the system can later change this title if another one is preferred.

At the conclusion of the topic extraction process, processor 36 saves the topics in memory 38, along with the dictionary of words that were used in deriving the topics, at a topic storage step 66. For each topic, processor 36 saves the distributions of the words in the topic for future use in scoring and classifying conversation segments. Details of this scoring process are described below with reference to FIG. 5.

Segmenting Conversations

Figure 3:
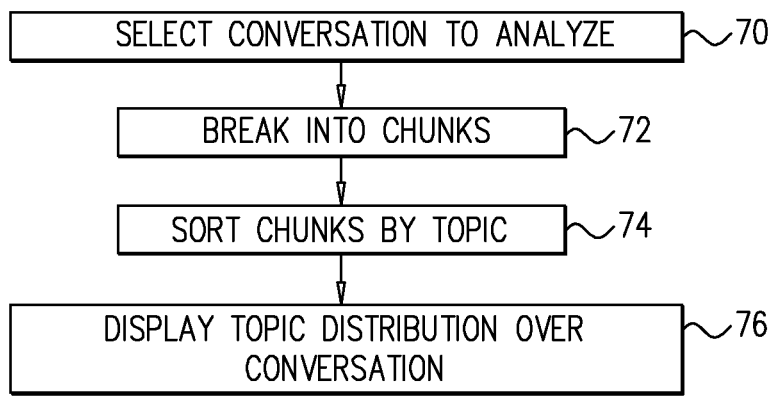
FIG. 3 is a flow chart that schematically illustrates a method for analyzing a recorded conversation, in accordance with an embodiment of the invention.

FIG. 3 is a flow chart that schematically illustrates a method for analyzing a recorded conversation, in accordance with an embodiment of the invention. To initiate this method, processor 36 selects a conversation to analyze, at a conversation selection step 70. The conversation may be selected from the same corpus as was used previously in learning the topics, as described above, or it may be a newly-collected conversation.

Processor 36 breaks the conversation into chunks, at chunk division step 72. The size of the chunks divided in step 72 is not necessarily the same as that of the chunks divided in step 58 above. Specifically, the inventors have found that it is helpful to use a smaller chunk size, on the order of fifty words, at step 72, as these small chunks are more likely to contain only a single topic. Other considerations may also be applied in choosing chunk boundaries, such as pauses in the conversation.

Processor 36 sorts the chunks by topics, at a segmentation step 74. For this purpose, processor 36 computes, with respect to each chunk, a respective topic score for each topic. The score is based on the words appearing in the chunk as compared to the frequency of occurrence of each of the words in each of the topics. Details of this scoring process are described below with reference to FIG. 5. When the resulting score for a certain topic is above a predefined threshold, processor 36 assigns the chunk to that topic. Processor 36 then divides the conversation into segments by grouping together adjacent chunks that are classified as belonging to a common topic. In other words, each such segment comprises a series of consecutive chunks belonging to the same topic.

On the other hand, when none of the topic scores for a given chunk is found to exceed the threshold at step 74, processor 36 classifies the chunk topic as "unknown." Typically, to maintain high precision of segment classification and thus high reliability in the analysis results that are presented to users, the threshold is set to a high value, for example 95% statistical confidence. Alternatively, different threshold levels may be set depending on application requirements.

Classification of neighboring chunks may also be used in refining results. Thus, for example, when a chunk with uncertain classification occurs within a sequence of other chunks that are assigned to a given topic with high confidence, this chunk may be incorporated into the same segment as the neighboring chunks.

Processor 36 presents the results of analysis of the conversation on display 40, at an output step 76. The display shows the segmentation of the conversation and the distribution of the topics among the segments.

FIG. 4 is a schematic representation of a computer screen 80, showing a graphical analysis of a recorded conversation, in accordance with an embodiment of the invention. This figure shows an example of a user interface screen, illustrating how a typical conversation has been segmented by topic at step 74 and presented at step 76 for subsequent review by the user.

Horizontal bars 82, labeled "Jabulani" and "Alex" (an account executive and a customer, for example), show which of these two parties to the conversation was speaking at each given moment during the conversation. A "Topics" bar 84 shows the topic of conversation at each corresponding moment during the conversation. The topics are color-coded, according to the legend appearing at the bottom of screen 80. Segments of the conversation that could not be classified with sufficient confidence on the basis of the existing set of topics receive no color code.

The user viewing screen 80 can browse through the conversation using a cursor 86. For example, to look into how pricing was negotiated between Jabulani and Alex, the user can move cursor horizontally to one of the segments labeled with the title "pricing" and then listen to or read the text of the conversation in this segment. Optionally, the user can also view a screenshot 88 of Jabulani's computer screen at each point in the conversation.

Segment Scoring

Figure 5:
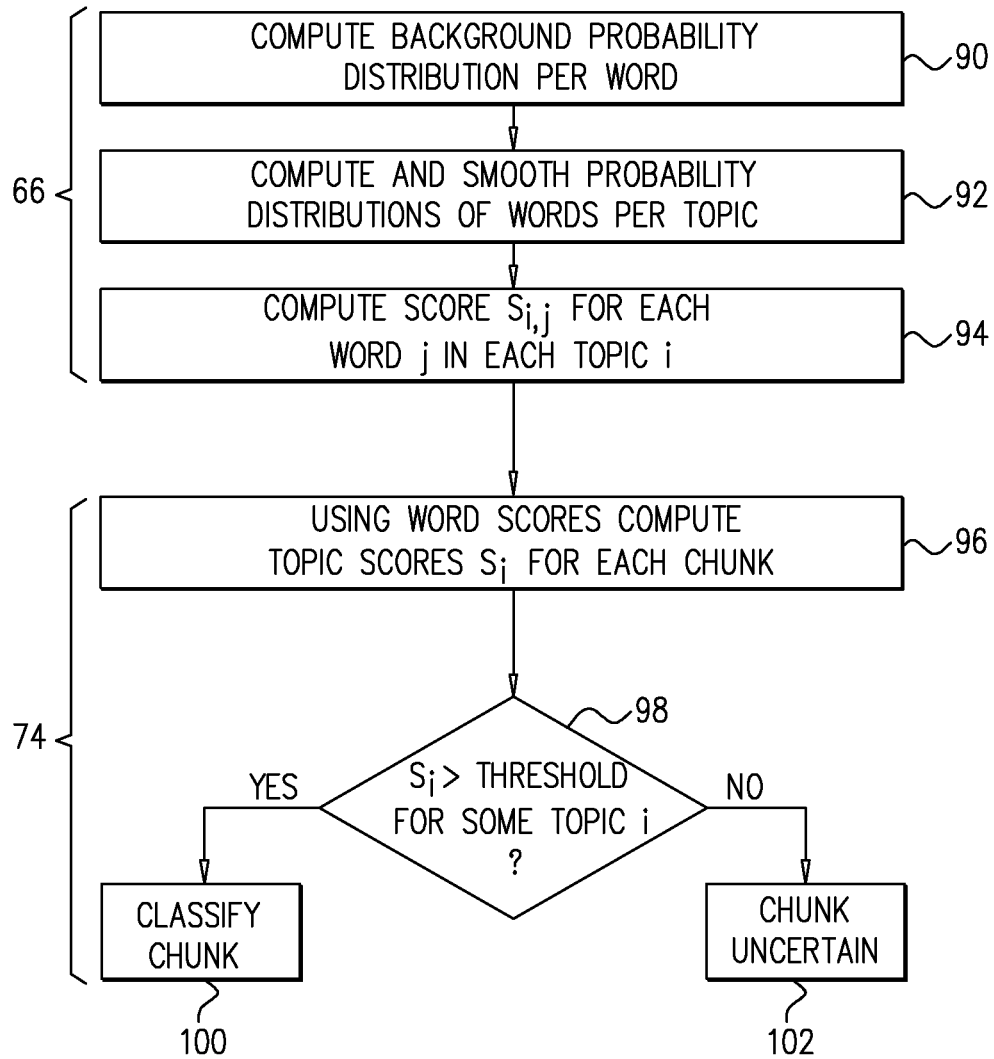
FIG. 5 is a flow chart that schematically illustrates a method for classification of topics in recorded conversations, in accordance with an embodiment of the invention.

FIG. 5 is a flow chart that schematically illustrates a method for classification of topics in recorded conversations, in accordance with an embodiment of the invention. This figure presents details of the implementation of step 66 (FIG. 2) and step 74 (FIG. 3), illustrating how the frequencies of occurrence of the words in chunks of the recorded conversations are used in classifying chunks into topics. For this purpose, in addition to deriving the optimal set of topics in step 66, processor 36 computes respective probabilities of association between the words and the topics, based on the frequencies of occurrence of the words in the chunks. Then, in step 74, processor 36 classifies each segment according to the respective probabilities of association of the words actually occurring in the segment.

In the method shown in FIG. 5, the probabilities of association computed at step 66 take the form of respective word scores for each word with respect to each of the topics. As a preliminary step in finding these word scores, processor 36 computes a background probability distribution for each word, at a background computation step 90. The background probability $q_j$ for each word j is simply the relative frequency of the word in the corpus:

$$q_j = \frac{\text{\# of times word } j \text{ appeared in the text}}{\text{\# of overall words in the text}}$$

In addition, processor 36 computes respective probability distributions of each of the words by topic, at a topic probability computation step 92. (These distributions are actually generated as a by-product of the inference of topics by the LDA algorithm at step 62.) The word/topic probability $p_{i,j}$ for any given word j in topic i is the likelihood that any given occurrence of the word in the corpus will be in a segment belonging to that topic. Thus, words that are distinctively associated with a given topic i will have relatively high values of $p_{i,j}$, while other words will have much lower values. The topic probability values are normalized so that $\Sigma_j p_{i,j} = 1$ for any topic i.

Mathematically, however, this formulation of $p_{i,j}$ can result in computational errors, particularly when a word in the dictionary fails to appear in a conversation. In order to avoid errors of this sort, processor 36 smooths the probability values that it computes at step 92. For example, smoothed topic probabilities $\hat{p}_{i,j}$ can be calculated by merging the raw word/topic probabilities $p_{i,j}$ with the background probabilities $q_j$ found at step 90:

$$\hat{p}_{i,j} = \alpha \cdot p_{i,j} + (1-\alpha) q_j$$

The inventors have found that setting $\alpha = 0.5$ gives good results, but other values may alternatively be chosen.

Based on the probabilities found at steps 90 and 92, processor 36 computes a score $s_{i,j}$ for each word j with respect to each topic i, at a word score computation step 94. This score is based on a comparison between the specific (smoothed) topic probability of the word and the background probability. For efficient computation, the log ratio of the topic and background probabilities may be used in this comparison:

$$s_{i,j} = (\log \hat{p}_{i,j} - \log q_j)$$

These scores are saved in memory 38 at step 66.

In order to sort the chunks by topic at step 74, processor 36 computes, for each chunk, a respective topic score $s_i$ for each topic i by combining the word scores $s_{i,j}$ of the words occurring in the chunk with respect to the topic, at a topic score computation step 96. The topic score $s_i$ for any given topic i can be computed simply by summing the word scores of the words occurring in the chunk, i.e., given a series of words $t_1, \ldots, t_n$, in a given chunk, the topic score for topic i computed for this chunk at step 96 will be:

$$s_i = \sum_{j=1}^{n} s_{i,t_j}$$

Based on the topic scores, processor 36 attempts to classify the chunk into a topic, at a score checking step 98. Specifically, if $s_i$ for a given topic i is greater than a predefined threshold, processor 36 will classify the chunk as belonging to this topic, at a classification step 100. The inventors have found that for high confidence of classification, using the normalized probabilities and logarithmic scoring function defined above, a chunk should be classified in some topic i if $s_i > 5$. Otherwise, the classification of the chunk is marked as uncertain or unknown, at a non-classification step 102. Alternatively, other thresholds and classification criteria may be applied, depending on application requirements.

Further details and examples of the scoring and segmentation approach shown in FIG. 5 and described above are presented in the above-mentioned U.S. Provisional Patent Application 62/460,899.

Use of Segmentation Results in Analytics and Prediction

The results of the sort of segmentation of conversations that is described above can be used in analyzing certain qualities of a conversation and possibly to predict its outcome. For example, the location and distribution of conversation segments can be used to assess whether the conversation is following a certain desired pattern. Additionally or alternatively, the location and distribution of conversation segments can be used to predict whether the conversation is likely to result in a desired business outcome.

For such purposes, processor 36 (or another computer, which receives the segmentation results) uses the segment location, distribution and related statistics, such as the duration of a given topic, the time of its first and last occurrences in a call, and the mean or median of its associated segments in calls, to predict the expected likelihood that a conversation belongs to a certain group. Example of useful groups of this sort are calls resulting in a desired business outcome, calls managed by top-performing sales representative, calls marked as good calls by team members, or calls following a desired pattern.

Based on these predictions, processor 36 provides insights and actionable recommendations for improving the sales process, for both the entire sales organization and for specific sales people or teams.

As one example, processor 36 can identify that conversations with a relatively long duration of segments titled "Product Differentiation," which marks segments in which a company's solution is compared to those of competitors, are statistically predicted to be more successful in closing sales. Processor 36 reports this result to the user and runs an analysis of "Product Differentiation" segments for each of fifteen sales people. On this basis, processor 36 identifies that calls by John Doe have a short total duration of segments on the topic of "Product Differentiation," and recommends that John discuss "Product Differentiation" more. Based on the analyzed calls, processor 36 provides this recommendation to several other team members but not to the rest of the team.

As another example, processor 36 can indicate, in real-time, that a sales representative is speaking too long, too little, too late or too early on a certain topic, such as speaking about the "Pricing" topic too early in a call. The rules for such alerts can be set up manually or automatically by comparing conversations against those of the best-performing sales representative.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for information processing, comprising:
receiving in a computer a corpus of recorded conversations, with two or more speakers participating in each conversation;
computing, by the computer, respective frequencies of occurrence of multiple words in each of a plurality of chunks in each of the recorded conversations;
based on the frequencies of occurrence of the words over the conversations in the corpus, deriving autonomously by the computer an optimal set of topics to which the chunks can be assigned such that the optimal set maximizes a likelihood that the chunks will be generated by the topics in the set;
segmenting a recorded conversation from the corpus, using the derived topics into a plurality of segments, such that each segment is classified as belonging to a particular topic in the optimal set; and
displaying a distribution of the segments and respective classifications of the segments into the topics over a duration of the recorded conversation on a computer interface that graphically illustrates the respective classifications and durations of the segments during the recorded conversation and shows which of the speakers were speaking during each of the segments.

2. The method according to claim 1, wherein deriving the optimal set of the topics comprises extracting the topics from the conversations by the computer without using a pre-classified training set.

3. The method according to claim 1, wherein receiving the corpus comprises:
converting the conversations to a textual form;
analyzing a syntax of the conversations in the textual form; and
discarding from the corpus the conversations in which the analyzed syntax does not match syntactical rules of a target language.

4. The method according to claim 1, wherein deriving the optimal set of topics comprises defining a target number of topics, and applying Latent Dirichlet Allocation to the corpus in order to derive the target number of the topics.

5. The method according to claim 1, and comprising automatically assigning, by the computer, respective titles to the topics.

6. The method according to claim 5, wherein automatically assigning the respective titles comprises, for each topic, extracting from the segments of the conversations in the corpus that are classified as belonging to the topic one or more n-grams that statistically differentiate the segments classified as belonging to the topic from the segments that belong to the remaining topics in the set, and selecting one of the extracted n-grams as a title for the topic.

7. The method according to claim 1, wherein deriving the optimal set of the topics comprises computing, based on the frequencies of occurrence of the words in the chunks, respective probabilities of association between the words and the topics, and
wherein segmenting the recorded conversation comprises classifying each segment according to the respective probabilities of association of the words occurring in the segment.

8. The method according to claim 7, wherein computing the respective probabilities of association comprises computing respective word scores for each word with respect to each of the topics based on the probabilities of association, and
wherein classifying each segment comprises:
for each chunk of the recorded conversation, deriving respective topic scores for the topics in the set by combining the word scores of the words occurring in the chunk with respect to each of the topics;
classifying the chunks into topics based on the respective topic scores; and
defining the segments by grouping together adjacent chunks that are classified as belonging to a common topic.

9. The method according to claim 1, wherein deriving the optimal set of topics comprises receiving seed words for one or more of the topics from a user of the computer.

10. The method according to claim 1, and comprising automatically applying, by the computer, the distribution of the segments in predicting whether a given conversation is likely to result in a specified outcome.

11. The method according to claim 1, and comprising automatically applying, by the computer, the distribution of the segments in assessing whether a given conversation follows a specified pattern.

12. An information processing system, comprising:
a memory, which is configured to store a corpus of recorded conversations, with two or more speakers participating in each conversation; and
a processor, which is configured to compute respective frequencies of occurrence of multiple words in each of a plurality of chunks in each of the recorded conversations, and to derive autonomously, based on the frequencies of occurrence of the words over the conversations in the corpus, an optimal set of topics to which the chunks can be assigned such that the optimal set maximizes a likelihood that any given chunk will be assigned to a single topic in the set, and to segment a recorded conversation from the corpus, using the derived topics into a plurality of segments, such that each segment is classified as belonging to a particular topic in the optimal set, and to display a distribution of the segments and respective classifications of the segments into the topics over a duration of the recorded conversation on a computer interface that graphically illustrates the respective classifications and durations of the segments during the recorded conversation and shows which of the speakers were speaking during each of the segments.

13. The system according to claim 12, wherein the processor is configured to extract the topics from the conversations without using a pre-classified training set.

14. The system according to claim 12, wherein the processor is configured to convert the conversations to a textual form, to analyze a syntax of the conversations in the textual form, and to discard from the corpus the conversations in which the analyzed syntax does not match syntactical rules of a target language.

15. The system according to claim 12, wherein the processor is configured to accept a definition of a target number of topics, and to apply Latent Dirichlet Allocation to the corpus in order to derive the target number of the topics.

16. The system according to claim 12, wherein the processor is configured to automatically assign respective titles to the topics.

17. The system according to claim 16, wherein the processor is configured to assign the respective titles by extracting, for each topic, from the segments of the conversations in the corpus that are classified as belonging to the topic one or more n-grams that statistically differentiate the segments classified as belonging to the topic from the segments that belong to the remaining topics in the set, and selecting one of the extracted n-grams as a title for the topic.

18. The system according to claim 12, wherein the processor is configured to compute, based on the frequencies of occurrence of the words in the chunks, respective probabilities of association between the words and the topics, and to classify each segment according to the respective probabilities of association of the words occurring in the segment.

19. The system according to claim 18, wherein the processor is configured to compute respective word scores for each word with respect to each of the topics based on the probabilities of association, to derive, for each chunk of the recorded conversation, respective topic scores for the topics in the set by combining the word scores of the words occurring in the chunk with respect to each of the topics, to classify the chunks into topics based on the respective topic score, and to define the segments by grouping together adjacent chunks that are classified as belonging to a common topic.

20. The system according to claim 12, wherein the processor is configured to receive seed words for one or more of the topics from a user of the system and to apply the seed words in deriving the optimal set of topics.

21. The system according to claim 12, wherein the processor is configured to automatically apply the distribution of the segments in predicting whether a given conversation is likely to result in a specified outcome.

22. The system according to claim 12, wherein the processor is configured to automatically apply the distribution of the segments in assessing whether a given conversation follows a specified pattern.

23. A computer software product, comprising a non-transitory computer-readable medium in which program instructions are stored, which instructions, when read by a computer, cause the computer to store a corpus of recorded conversations, with two or more speakers participating in each conversation, to compute respective frequencies of occurrence of multiple words in each of a plurality of chunks in each of the recorded conversations, and to derive autonomously, based on the frequencies of occurrence of the words over the conversations in the corpus, an optimal set of topics to which the chunks can be assigned such that the optimal set maximizes a likelihood that any given chunk will be assigned to a single topic in the set, and to segment a recorded conversation from the corpus, using the derived topics into a plurality of segments, such that each segment is classified as belonging to a particular topic in the optimal set, and to display a distribution of the segments and respective classifications of the segments into the topics over a duration of the recorded conversation on a computer interface that graphically illustrates the respective classifications and durations of the segments during the recorded conversation and shows which of the speakers were speaking during each of the segments.

24. The product according to claim 23, wherein the instructions cause the computer to extract the topics from the conversations without using a pre-classified training set.

25. The product according to claim 23, wherein the instructions cause the computer to convert the conversations to a textual form, to analyze a syntax of the conversations in the textual form, and to discard from the corpus the conversations in which the analyzed syntax does not match syntactical rules of a target language.

26. The product according to claim 23, wherein the instructions cause the computer to accept a definition of a target number of topics, and to apply Latent Dirichlet Allocation to the corpus in order to derive the target number of the topics.

27. The product according to claim 23, wherein the instructions cause the computer to automatically assign respective titles to the topics.

28. The product according to claim 27, wherein the instructions cause the computer to assign the respective titles by extracting, for each topic, from the segments of the conversations in the corpus that are classified as belonging to the topic one or more n-grams that statistically differentiate the segments classified as belonging to the topic from the segments that belong to the remaining topics in the set, and selecting one of the extracted n-grams as a title for the topic.

29. The product according to claim 23, wherein the instructions cause the computer to compute, based on the frequencies of occurrence of the words in the chunks, respective probabilities of association between the words and the topics, and to classify each segment according to the respective probabilities of association of the words occurring in the segment.

30. The product according to claim 29, wherein the instructions cause the computer to compute respective word scores for each word with respect to each of the topics based on the probabilities of association, to derive, for each chunk of the recorded conversation, respective topic scores for the topics in the set by combining the word scores of the words occurring in the chunk with respect to each of the topics, to classify the chunks into topics based on the respective topic score, and to define the segments by grouping together adjacent chunks that are classified as belonging to a common topic.

31. The product according to claim 23, wherein the instructions cause the computer to receive seed words for one or more of the topics from a user of the computer and to apply the seed words in deriving the optimal set of topics.

32. The product according to claim 23, wherein the instructions cause the computer to automatically apply the distribution of the segments in predicting whether a given conversation is likely to result in a specified outcome.

33. The product according to claim 23, wherein the instructions cause the computer to automatically apply the distribution of the segments in assessing whether a given conversation follows a specified pattern.

* * * * *